US011015654B2

United States Patent
Biegner et al.

(10) Patent No.: US 11,015,654 B2
(45) Date of Patent: May 25, 2021

(54) ROLLING-ELEMENT BEARING UNIT

(71) Applicant: AKTIEBOLAGET SKF, Gothenburg (SE)

(72) Inventors: Johannes Biegner, Prichsenstadt (DE); Dieter Schleyer, Üchtelhausen/Hesselbach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/684,719

(22) Filed: Nov. 15, 2019

(65) Prior Publication Data

US 2020/0182303 A1 Jun. 11, 2020

(30) Foreign Application Priority Data

Dec. 10, 2018 (DE) .......................... 102018221324.0

(51) Int. Cl.
*F16C 41/00* (2006.01)
*F16C 19/38* (2006.01)

(52) U.S. Cl.
CPC ............ *F16C 41/00* (2013.01); *F16C 19/386* (2013.01); *F16C 2233/00* (2013.01)

(58) Field of Classification Search
CPC ...... F16C 41/00; F16C 41/007; F16C 41/008; F16C 2230/00; F16C 19/386
See application file for complete search history.

(56) References Cited

U.S. PATENT DOCUMENTS

| | | | | |
|---|---|---|---|---|
| 4,499,394 A * | 2/1985 | Koal | .................... | A61B 5/1036 310/319 |
| 6,161,962 A * | 12/2000 | French | .................. | F16C 41/008 384/448 |
| 6,535,135 B1 * | 3/2003 | French | .................. | F16C 41/008 340/682 |
| 6,585,420 B2 * | 7/2003 | Okada | ................... | F16C 41/008 303/168 |
| 7,034,711 B2 * | 4/2006 | Sakatani | ............... | F16C 41/008 340/682 |
| 7,819,026 B2 * | 10/2010 | Ozaki | ................. | B60B 27/0005 73/862.322 |
| 8,167,497 B2 * | 5/2012 | Ozaki | ................... | F16C 19/522 384/448 |
| 2008/0170817 A1 * | 7/2008 | McDearmon | ......... | F16C 19/522 384/448 |

* cited by examiner

*Primary Examiner* — James Pilkington
(74) *Attorney, Agent, or Firm* — J-TEK Law IP PLLC; Scott T. Wakeman; Mark A. Ussai

(57) ABSTRACT

A rolling-element bearing unit includes at least one inner ring, an outer ring, and first and second rolling-element rows between the at least one inner ring and the outer ring, the second rolling-element row being axially spaced from the first rolling-element row by a gap, and the bearing unit including at least one sensor unit in the gap.

11 Claims, 2 Drawing Sheets

ROLLING-ELEMENT BEARING UNIT

CROSS-REFERENCE

This application claims priority to German patent application no. 10 2018 221 324.0 filed on Dec. 10, 2018, the contents of which are fully incorporated herein by reference.

TECHNOLOGICAL FIELD

The disclosure is directed to a rolling-element bearing unit having at least one sensor unit.

BACKGROUND

A rolling-element bearing unit including a sensor unit is known, which sensor unit is disposed on a rolling-element bearing of the rolling-element bearing unit.

SUMMARY

An aspect of the disclosure relates to providing a rolling-element bearing unit of the above-described type having increased efficiency.

The disclosure emanates from a rolling-element bearing unit including at least one sensor unit.

The disclosed sensor unit is disposed axially between two rolling-element rows of the rolling-element bearing unit. That the "sensor unit is axially disposed between two rolling-element rows of the rolling-element bearing unit" is to be understood in particular to mean that the sensor unit is disposed in a spatial region whose boundaries are defined by two planes that both exclusively have surface-extension directions that are perpendicular to an axial direction of the rolling-element bearing unit, wherein the planes contact mutually facing ends of the rolling-element rows. According to the disclosure an increased efficiency can be achieved. In particular the sensor unit can measure at a point at which high-quality measurement results are achievable. Furthermore in particular installation space can be used efficiently.

Further advantages arise from the following description of the drawings. An exemplary embodiment of the invention is depicted in the drawings. The drawings, the description, and the claims contain numerous features in combination. The person skilled in the art will also advantageously consider the features individually and combine them into further meaningful combinations.

DETAILED DESCRIPTION

Figure 1:
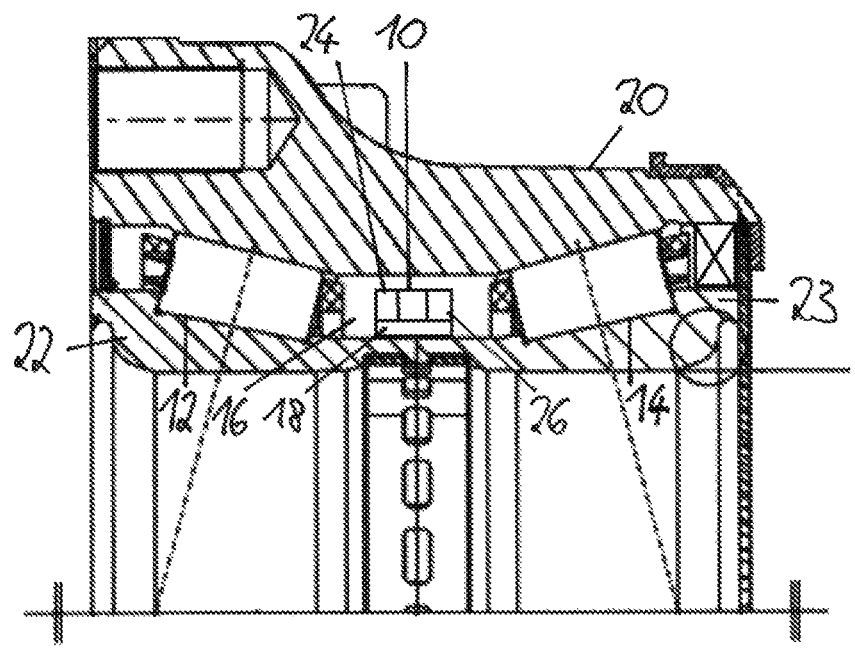
FIG. 1 is an axial section through a rolling-element bearing unit according to an embodiment of the present disclosure.

FIG. 1 shows a schematic axial section through an inventive rolling-element bearing unit including a sensor unit 10 that is disposed axially between two rolling-element rows 12, 14 of the rolling-element bearing unit and in an interior 16 of the rolling-element bearing unit. The first rolling-element row 12 contacts an outer ring 20 and an inner ring 22 of the rolling-element bearing unit. Furthermore the second rolling-element row 14 contacts the outer ring 20 and an inner ring 23 of the rolling-element bearing unit. The sensor unit 10 includes individual sensors by which it is equipped to measure an atmospheric humidity inside the inner space 16 of the rolling-element bearing unit, a pressure in the interior, vibrations of the inner rings, and a prevailing temperature in the interior. The interior 16 is located between the outer ring and the inner rings and is sealed at its axial ends by seals.

The sensor unit 10 is disposed on a circuit board 18 of the rolling-element bearing unit and attached thereto. Furthermore the rolling-element bearing unit includes a radio unit 24 and an energy-supply unit 26 configured as a battery; they are also disposed on the circuit board 18 and attached thereto. The sensor unit 10, the radio unit 24, and the energy-supply unit 26 are electrically connected to one another by the circuit board 18. Measurement results achieved by the sensor unit are transmitted from the radio unit 24 to a receiver (not illustrated) outside the rolling-element bearing unit and can be further processed there.

Figure 2:
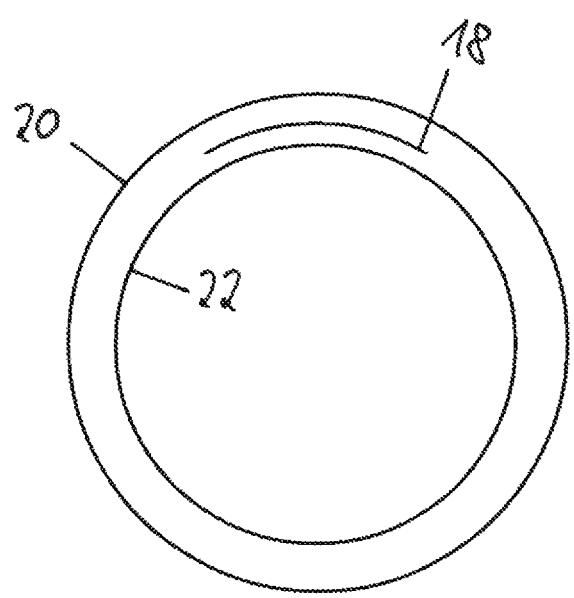
FIG. 2 is a schematic view along an axial direction on an outer ring and a first inner ring of the rolling-element bearing unit, wherein a second inner ring and a second rolling-element row are removed.
Figure 3:
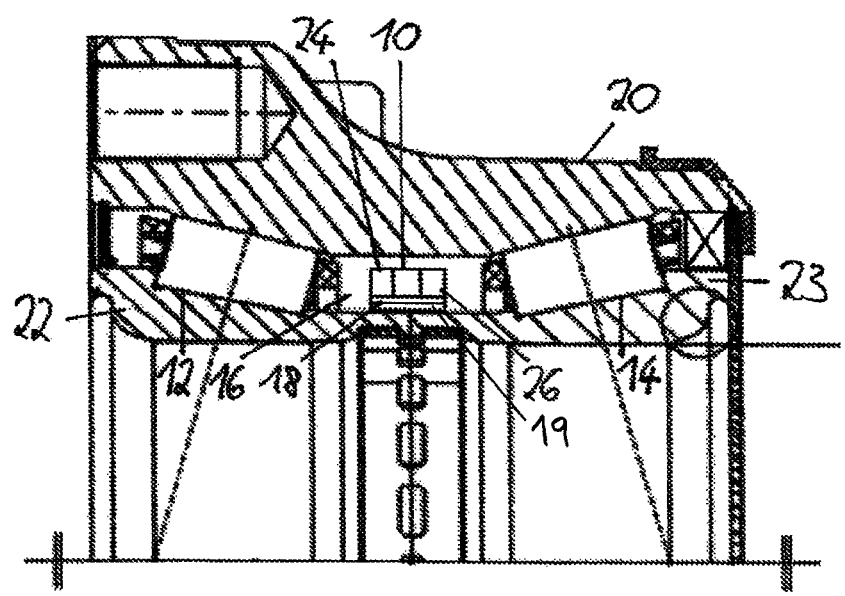
FIG. 3 is an axial section through the rolling-element bearing unit according to an alternative embodiment of the present disclosure.

The sensor unit 10, the radio unit 24, the energy-supply unit 26, and the circuit board 18 are encapsulated such that they are protected from oil. The circuit board 18 is directly connected to the inner rings 22, 23 and also attached thereto. The circuit board 18 is curved (FIG. 2). With respect to a view in an axial direction it has a curvature that is greater than a curvature of the outer ring and is less than a curvature of the inner ring 22.

The rolling-element bearing unit and the receiver can be part of a truck, of an automobile, or of a rail vehicle.

In an alternative exemplary embodiment the circuit board 18 is not directly attached to the inner rings 22, 23 but to a ring 19 that is attached to a small ring or to both inner rings 22, 23 and can press a seal onto a gap between the inner rings. Due to this attaching the sensor unit is also attached to the respective ring.

In a further alternative exemplary embodiment the sensor unit, the radio unit, and the energy-supply unit are not disposed on a circuit board, but rather separately disposed on the inner ring and electrically connected by cables.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearing units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Sensor unit
12 Rolling-element row
14 Rolling-element row
16 Interior
18 Circuit board
20 Outer ring
22 Inner ring
23 Inner ring
24 Radio unit
26 Energy supply unit

What is claimed is:

1. A rolling-element bearing unit comprising:
   two inner rings;
   an outer ring;
   a first rolling-element row between one of the two inner rings and the outer ring;
   a second rolling-element row between the other one of the two inner rings and the outer ring, the second rolling-element row being axially spaced from the first rolling-element row by a gap; and
   at least one sensor unit and at least one of a radio unit and an energy-supply unit each disposed on a circuit board located in the gap, the circuit board electrically connecting the sensor unit with the at least one of the radio unit and the energy-supply unit;
   wherein the circuit board is attached to a ring and the ring extends across and is attached to the two inner rings.

2. The rolling-element bearing unit according to claim 1, wherein the sensor unit is configured to measure an atmospheric humidity and/or a moisture and/or a pressure in the gap and/or vibrations and/or a temperature.

3. The rolling-element bearing unit according to claim 1, the circuit board is curved.

4. The rolling-element bearing unit according to claim 3, wherein a curvature of the circuit board falls between a curvature of the outer ring and a curvature of the inner ring.

5. The rolling-element bearing unit according to claim 1,
   wherein the sensor unit is configured to measure one or more conditions selected from the group consisting of: atmospheric humidity, moisture, pressure, vibrations and temperature,
   wherein the circuit board has a curvature that falls between a curvature of the outer ring and a curvature of the inner ring.

6. The rolling-element bearing unit according to claim 1, wherein the energy-supply unit is configured as a battery.

7. The rolling-element bearing unit according to claim 1, wherein the radio unit is configured to transmit measurements from the at least one sensor unit to an external receiver.

8. A truck, automobile, or rail vehicle including a rolling-element bearing unit according to claim 1.

9. A rolling-element bearing unit comprising:
   two inner rings;
   an outer ring;
   a first rolling-element row between one of the two inner rings and the outer ring;
   a second rolling-element row between the other one of the two inner rings and the outer ring, the second rolling-element row being axially spaced from the first rolling-element row by a gap;
   a circuit board disposed in the gap and coupled with the inner ring; and
   a sensor unit, a radio unit and an energy-supply unit each being disposed upon the circuit board, the circuit board electrically connecting the sensor unit directly with each one of the radio unit and the energy-supply unit;
   wherein the circuit board is attached to a ring and the ring extends across and is attached to the two inner rings.

10. The rolling-element bearing unit according to claim 9, wherein the energy-supply unit is configured as a battery.

11. The rolling-element bearing unit according to claim 9, wherein the radio unit is configured to transmit measurements from the sensor unit to an external receiver.

* * * * *